US012763375B2

(12) United States Patent
Nakai et al.

(10) Patent No.: US 12,763,375 B2
(45) Date of Patent: Oct. 13, 2026

(54) SECONDARY BATTERY

(71) Applicant: SANYO Electric Co., Ltd., Kadoma (JP)

(72) Inventors: Yuki Nakai, Osaka (JP); Atsushi Kaiduka, Osaka (JP); Tatsuhiko Suzuki, Osaka (JP); Takaharu Morikawa, Osaka (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 714 days.

(21) Appl. No.: 17/793,267

(22) PCT Filed: Jan. 6, 2021

(86) PCT No.: PCT/JP2021/000179
§ 371 (c)(1),
(2) Date: Jul. 15, 2022

(87) PCT Pub. No.: WO2021/149489
PCT Pub. Date: Jul. 29, 2021

(65) Prior Publication Data
US 2023/0039429 A1 Feb. 9, 2023

(30) Foreign Application Priority Data
Jan. 23, 2020 (JP) ................................ 2020-008912

(51) Int. Cl.
*H01M 10/0587* (2010.01)

(52) U.S. Cl.
CPC ............................... *H01M 10/0587* (2013.01)

(58) Field of Classification Search
CPC .... H01M 10/0587; H01M 4/13; H01M 4/139; H01M 4/64; H01M 4/661; H01M 10/052; Y02E 60/10; Y02P 70/50
See application file for complete search history.

(56) References Cited

U.S. PATENT DOCUMENTS 8,192,875 B2 6/2012 Sano
9,960,411 B2 5/2018 Umeyama et al.
(Continued)

FOREIGN PATENT DOCUMENTS

JP 10-188994 A 7/1998
JP 2001-283862 A 10/2001
(Continued)

OTHER PUBLICATIONS

JP-2010114093-A English Translation (Year: 2010).*
(Continued)

*Primary Examiner* — Anca Eoff
*Assistant Examiner* — Madison Leigh Kyle
(74) *Attorney, Agent, or Firm* — WHDA, LLP

(57) ABSTRACT

With respect to a secondary battery of one embodiment of the present invention, at least one of a positive electrode core body and a negative electrode core body is configured such that the tensile elongation in the central part in the width direction is higher than the tensile elongation in both end parts in the width direction. With respect to a secondary battery of another embodiment of the present invention, at least one of a positive electrode core body and a negative electrode core body is configured such that the number of crystal grains per unit area in the central part in the width direction is smaller than the number of crystal grains per unit area in both end parts in the width direction.

6 Claims, 2 Drawing Sheets

(56) References Cited

U.S. PATENT DOCUMENTS

| | | | | |
|---|---|---|---|---|
| 2008/0241647 | A1* | 10/2008 | Fukui | H01M 4/386 29/623.5 |
| 2009/0274951 | A1* | 11/2009 | Kinoshita | H01M 10/0587 429/94 |
| 2014/0065450 | A1* | 3/2014 | Senoue | H01M 4/661 429/211 |
| 2015/0372338 | A1* | 12/2015 | Tsuchiya | H01M 4/366 29/623.5 |
| 2016/0141597 | A1 | 5/2016 | Umeyama et al. | |
| 2018/0080134 | A1 | 3/2018 | Honkawa et al. | |
| 2019/0103609 | A1 | 4/2019 | Yamami et al. | |
| 2019/0148736 | A1 | 5/2019 | Cheng et al. | |
| 2019/0273262 | A1 | 9/2019 | Matsumasa et al. | |
| 2020/0212501 | A1* | 7/2020 | Matsumasa | H01M 4/134 |
| 2021/0010110 | A1 | 1/2021 | Kaneko | |
| 2021/0119219 | A1* | 4/2021 | Liu | H01M 4/661 |

FOREIGN PATENT DOCUMENTS

| | | | |
|---|---|---|---|
| JP | 2004-95476 | A | 3/2004 |
| JP | 2004-171978 | A | 6/2004 |
| JP | 2005-135856 | A | 5/2005 |
| JP | 2010114093 | A * | 5/2010 |
| JP | 2010-232088 | A | 10/2010 |
| JP | 2010-287465 | A | 12/2010 |
| JP | 2014-60092 | A | 4/2014 |
| JP | 2014089916 | A * | 5/2014 |
| JP | 2014-123485 | A | 7/2014 |
| JP | 2014143008 | A * | 8/2014 |
| JP | 2016-058181 | A | 4/2016 |
| JP | 2016-100117 | A | 5/2016 |
| JP | 2018-028112 | A | 2/2018 |
| JP | 2019-67543 | A | 4/2019 |
| JP | 2019-90107 | A | 6/2019 |
| JP | 2019-153438 | A | 9/2019 |
| KR | 2018-0122074 | A | 11/2018 |
| WO | 2019/188452 | A1 | 10/2019 |

OTHER PUBLICATIONS

Office Action dated Nov. 29, 2023, issued in counterpart CN application No. 202180009339.6, with English translation. (13 pages).

International Search Report dated Mar. 23, 2021, issued in counterpart International Application No. PCT/JP2021/000179, with English Translation (6 pages).

Office Action dated Nov. 1, 2022, issued in counterpart IN Application No. 202247040899, with English Translation. (5 pages).

* cited by examiner

SECONDARY BATTERY

CROSS-REFERENCE TO RELATED APPLICATIONS

This application is a national stage of International Application No.PCT/JP2021/000179, filed Jan. 6, 2021, which claims priority to Japanese Patent Application No. 2020-008912 filed Jan. 23, 2020 both of which are hereby incorporated by reference in their entirety.

TECHNICAL FIELD

The present disclosure relates to a secondary battery.

BACKGROUND ART

A secondary battery such as a lithium ion battery comprises an electrode assembly formed by laminating a positive electrode and a negative electrode via a separator. Generally, each electrode plate includes a core configured by metal foil and an active material layer formed on a surface of the core. The active material layer is expanded and contracted by charging/discharging, and a degree of expansion/contraction increases for a battery of a high energy density in particular. Accordingly, a large load acts on a part of the core during the charging/discharging, and local deformation of the electrode plate may occur.

Conventionally, a technology for mitigating effects of the expansion/contraction of the active material layer accompanying the charging/discharging has been proposed. For example, Patent Literature 1 discloses an electrode for a secondary battery using a core an elongation percentage of which is 13% or higher. Patent Literature 1 describes an effect of suppressing pulverization of active material particles and falling from the core of the active material layer due to expansion/contraction of the active material layer. In addition, Patent Literature 2 discloses a manufacturing method of a negative electrode for a secondary battery including a process of heating copper foil to be a negative electrode core to a recrystallization temperature or higher and softening the copper foil.

CITATION LIST

Patent Literature

PATENT LITERATURE 1: Japanese Unexamined Patent Application Publication No. 2005-135856

PATENT LITERATURE 2: Japanese Unexamined Patent Application Publication No. 2016-100117

SUMMARY

Technical Problem

As a method for suppressing local deformation of an electrode plate, it is an effective technique to increase an elongation percentage of a core as disclosed in Patent Literatures 1 and 2, however, when the elongation percentage of the core becomes too high, there is a risk that the electrode plate is brought into contact with an outer housing can or a sealing plate in a case where the electrode plate is expanded by charging/discharging. Accordingly, it is needed to limit a size of the electrode plate and that leads to decline of a capacity. In addition, while predetermined tension acts on the core when manufacturing the electrode plate, when the elongation percentage of the core is high, there are cases where the core is elongated by the tension during manufacture and production stability is damaged.

It is an object of the present disclosure to provide a secondary battery capable of suppressing local deformation of an electrode plate accompanying charging/discharging without causing failures such as decline of a capacity and decline of production stability.

Solution to Problem

A secondary battery as one aspect of the present disclosure is the secondary battery comprising an electrode assembly including a positive electrode, a negative electrode and a separator, the positive electrode and the negative electrode of which are laminated via the separator, the positive electrode includes a positive electrode core having a longitudinal direction and a width direction and a positive electrode active material layer formed on a surface of the positive electrode core, the negative electrode includes a negative electrode core having a longitudinal direction and a width direction and a negative electrode active material layer formed on a surface of the negative electrode core, and a tensile elongation percentage at a width direction center portion of at least one of the positive electrode core and the negative electrode core is higher than a tensile elongation percentage at both width direction end portions of at least one of the positive electrode core and the negative electrode core.

A secondary battery as another aspect of the present disclosure is the secondary battery comprising an electrode assembly including a positive electrode, a negative electrode and a separator, the positive electrode and the negative electrode of which are laminated via the separator, the positive electrode includes a positive electrode core having a longitudinal direction and a width direction and a positive electrode active material layer formed on a surface of the positive electrode core, the negative electrode includes a negative electrode core having a longitudinal direction and a width direction and a negative electrode active material layer formed on a surface of the negative electrode core, and a number of crystal grains per unit area at a width direction center portion of at least one of the positive electrode core and the negative electrode core is smaller than a number of crystal grains per unit area at both width direction end portions of at least one of the positive electrode core and the negative electrode core.

Advantageous Effects of Invention

According to the secondary battery relating to the present disclosure, local deformation of an electrode plate accompanying charging/discharging may be suppressed without causing failures such as decline of a capacity and decline of production stability. When the electrode plate is locally deformed, uniformity of battery reaction is damaged and a cycle characteristic declines for example, however, according to the secondary battery relating to the present disclosure, decline of the cycle characteristic due to the local deformation of the electrode plate may be suppressed.

DESCRIPTION OF EMBODIMENT

Hereinafter, an example of the embodiment of a secondary battery relating to the present disclosure will be explained in details with reference to the drawings. Note that it is assumed from the first that embodiments and modifications illustrated below are to be selectively combined. In addition, in the present description, description of "numerical value A-numerical value B" means "numerical value A or higher and numerical value B or lower" unless otherwise mentioned.

Figure 1:
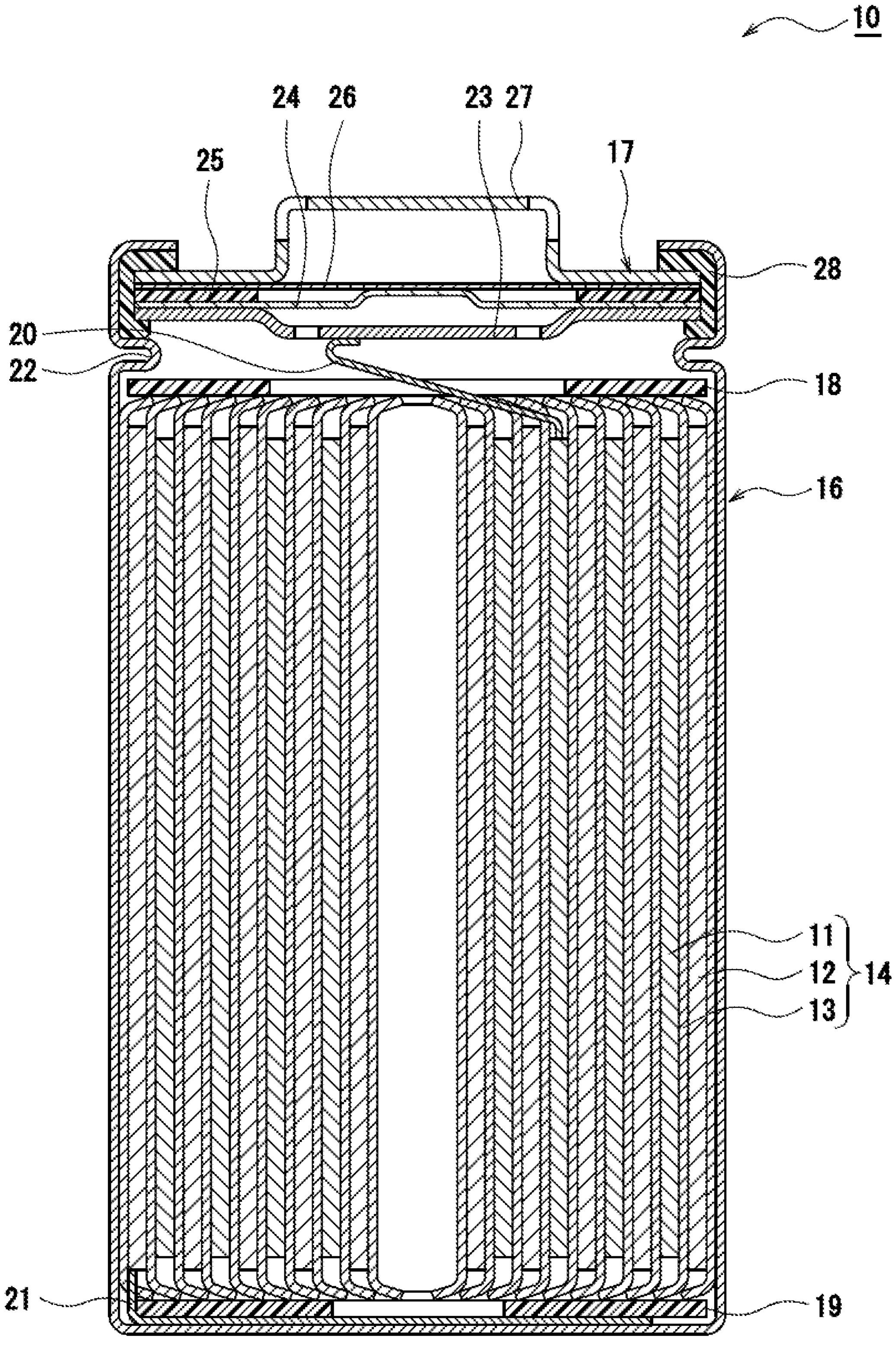
FIG. 1 is a sectional view of a cylindrical battery as an example of an embodiment.

FIG. 1 is a sectional view of a secondary battery 10 as an example of the embodiment. The secondary battery 10 illustrated in FIG. 1 comprises a bottomed cylindrical outer housing can 16 as an outer body, but the outer body is not limited thereto. The secondary battery relating to the present disclosure may be, for example, a rectangular battery comprising an outer housing can in a bottomed rectangular tube shape, a coin shape battery comprising an outer housing can in a coin shape, or a laminated battery comprising an outer body configured by a lamination sheet including a metal layer and a resin layer.

As illustrated in FIG. 1, the secondary battery 10 comprises a wound type electrode assembly 14 for which a positive electrode 11 and a negative electrode 12 are wound in a helical shape via a separator 13, and the cylindrical outer housing can 16 that houses the electrode assembly 14. In addition, the secondary battery 10 comprises an electrolyte housed in the outer housing can 16 together with the electrode assembly 14. The outer housing can 16 is a metallic container in a bottomed cylindrical shape opened on one side in an axial direction, and an opening of the outer housing can 16 is closed by a sealing assembly 17. Hereinafter, for convenience of explanation, the side of the sealing assembly 17 of the battery is up and a bottom portion side of the outer housing can 16 is down.

The electrolyte may be an aqueous electrolyte but is preferably a non-aqueous electrolyte. The non-aqueous electrolyte includes a non-aqueous solvent and an electrolyte salt dissolved in the non-aqueous solvent. For the non-aqueous solvent, ester, ether, nitrile, amide and a mixed solvent of two or more kinds thereof are used for example. The non-aqueous solvent may contain a halogen substitution product in which at least some hydrogen of the above solvents is replaced by halogen atoms such as fluorine. For the electrolyte salt, a lithium salt such as $LiPF_6$ is used for example. Note that the electrolyte is not limited to a liquid electrolyte and may be a solid electrolyte.

The positive electrode 11, the negative electrode 12 and the separator 13 configuring the electrode assembly 14 are all a belt-like long body, and are alternately laminated in a radial direction of the electrode assembly 14 by being wound in the helical shape. The negative electrode 12 is formed in a dimension one size larger than the positive electrode 11 in order to prevent deposition of lithium. That is, the negative electrode 12 is formed longer than the positive electrode 11 in a longitudinal direction and a width direction. The two separators 13 are formed in a dimension one size larger than at least the positive electrode 11, and are arranged so as to hold the positive electrode 11 therebetween for example. The electrode assembly 14 includes a positive electrode lead 20 connected to the positive electrode 11 by welding or the like and a negative electrode lead 21 connected to the negative electrode 12 by welding or the like.

Above and below the electrode assembly 14, insulating plates 18 and 19 are arranged respectively. In the example illustrated in FIG. 1, the positive electrode lead 20 passes through a through-hole of the insulating plate 18 and extends to the side of the sealing assembly 17, and the negative electrode lead 21 passes through a through-hole of the insulating plate 19 and extends to the bottom portion side of the outer housing can 16. The positive electrode lead 20 is connected to a lower surface of an internal terminal plate 23 of the sealing assembly 17 by welding or the like, and a cap 27 which is a top plate of the sealing assembly 17 electrically connected with the internal terminal plate 23 becomes a positive electrode terminal. The negative electrode lead 21 is connected to a bottom portion inner surface of the outer housing can 16 by welding or the like, and the outer housing can 16 becomes a negative electrode terminal.

A gasket 28 is provided between the outer housing can 16 and the sealing assembly 17, and sealability inside the battery is secured. On the outer housing can 16, a grooved portion 22 for which a part of a side face portion is projected to an inner side and which supports the sealing assembly 17 is formed. The grooved portion 22 is preferably formed in an annular shape along a circumferential direction of the outer housing can 16, and supports the sealing assembly 17 by the upper surface. The sealing assembly 17 is fixed to an upper portion of the outer housing can 16 by the grooved portion 22 and an opening end portion of the outer housing can 16 caulked to the sealing assembly 17.

The sealing assembly 17 has a structure that the internal terminal plate 23, a lower vent member 24, an insulating member 25, an upper vent member 26 and the cap 27 are laminated in order from the side of the electrode assembly 14. Each member configuring the sealing assembly 17 has a disk shape or a ring shape for example, and each member except the insulating member 25 is electrically connected to each other. The lower vent member 24 and the upper vent member 26 are connected at respective center portions, and the insulating member 25 is interposed between respective peripheral edge portions. When an internal pressure of the battery rises due to abnormal heat generation, the lower vent member 24 is deformed so as to push up the upper vent member 26 to the side of the cap 27 and is fractured and thus a current path between the lower vent member 24 and the upper vent member 26 is shut off. When the internal pressure rises further, the upper vent member 26 is fractured and gas is discharged from an opening of the cap 27.

Figure 2:
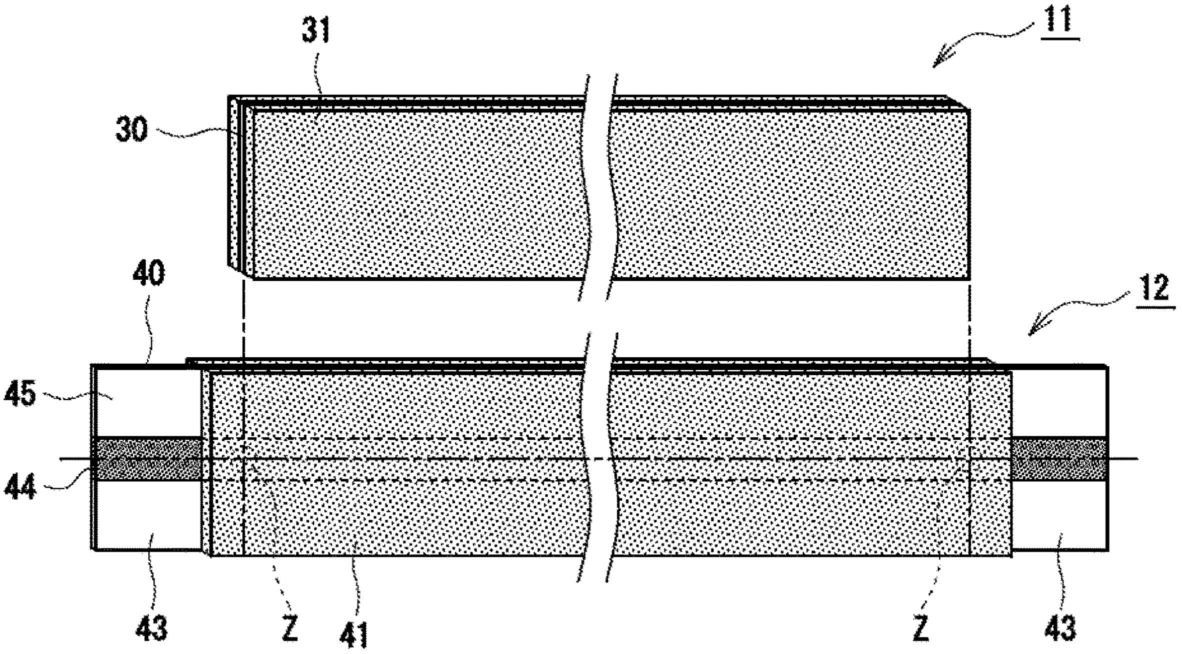
FIG. 2 is a perspective view of a positive electrode and a negative electrode as an example of the embodiment.

Hereinafter, with reference to FIG. 2, the positive electrode 11, the negative electrode 12 and the separator 13 configuring the electrode assembly 14, the negative electrode 12 in particular, will be explained in details. FIG. 2 is a perspective view of the positive electrode 11 and the negative electrode 12 and illustrates an opposite arrangement of each other.

While details will be described later, in the present embodiment, a tensile elongation percentage at a width direction center portion of a negative electrode core 40 is higher than a tensile elongation percentage at both width direction end portions of the negative electrode core 40. In addition, the number of crystal grains per unit area at the width direction center portion of the negative electrode core 40 is smaller than the number of the crystal grains per unit area at both width direction end portions of the negative electrode core 40. While the tensile elongation percentage of a positive electrode core 30 is practically same in an entire region and the number of the crystal grains per unit area is also practically same in the entire region, a configuration similar to the negative electrode core 40 may be applied to the positive electrode core 30 and the tensile elongation percentage at the width direction center portion of the positive electrode core 30 may be made higher than the tensile elongation percentage at both width direction end portions of the positive electrode core 30. In addition, the number of the crystal grains per unit area at the width direction center portion of the positive electrode core 30 may be smaller than the number of the crystal grains per unit area at both width direction end portions of the positive electrode core 30. Alternatively, the configuration may be applied only to the positive electrode core 30.

[Positive Electrode]

As illustrated in FIG. 2, the positive electrode 11 includes the positive electrode core 30, and a positive electrode active material layer 31 formed on a surface of the positive electrode core 30. For the positive electrode core 30, foil of a metal which is stable in a potential range of the positive electrode 11 such as aluminum and an aluminum alloy or a film for which the metal is arranged on a surface layer or the like can be used. An ideal example of the positive electrode core 30 is metal foil configured by the aluminum alloy containing iron. Thickness of the positive electrode core 30 is, for example, 5 μm to 20 μm. At the positive electrode 11, for example, the positive electrode active material layer 31 is not formed at a longitudinal direction center portion, an exposed portion (not illustrated) where the surface of the positive electrode core 30 is exposed is formed, and the positive electrode lead 20 is connected to the exposed portion.

It is preferable that the positive electrode active material layer 31 includes a positive electrode active material, a conductive agent and a binder and is formed on both surfaces of the positive electrode core 30. The positive electrode active material layer 31 has the thickness of 60 μm to 100 μm on one side of the positive electrode core 30 for example, and is formed on both surfaces of the positive electrode core 30 respectively with the same thickness. The positive electrode 11 can be manufactured by applying positive electrode mixture slurry including the positive electrode active material, the conductive agent and the binder or the like onto the positive electrode core 30, drying and then compressing a coated film and forming the positive electrode active material layer 31 on both surfaces of the positive electrode core 30.

For the positive electrode active material, for example, lithium transition metal composite oxide is used. Examples of metal elements contained in the lithium transition metal composite oxide are Ni, Co, Mn, Al, B, Mg, Ti, V, Cr, Fe, Cu, Zn, Ga, Sr, Zr, Nb, In, Sn, Ta and W. Among them, it is preferable to contain at least one of the group consisting of Ni, Co, Mn. Examples of ideal composite oxide are lithium transition metal composite oxide containing Ni, Co and Mn, and lithium transition metal composite oxide containing Ni, Co and Al.

An example of the conductive agent included in the positive electrode active material layer 31 is a carbon material such as carbon black, acetylene black, Ketjen black and graphite. Examples of the binder included in the positive electrode active material layer 31 are fluorocarbon resin such as polytetrafluoroethylene (PTFE) and polyvinylidene fluoride (PVdF), polyacrylonitrile (PAN), polyimide resin, acrylic resin and polyolefin resin. In addition, the resin and a cellulose derivative such as carboxymethyl cellulose (CMC) or the salt thereof and polyethylene oxide (PEO) or the like may be used together.

[Negative Electrode]

The negative electrode 12 includes the negative electrode core 40, and a negative electrode active material layer 41 formed on a surface of the negative electrode core 40. For the negative electrode core 40, foil of a metal which is stable in a potential range of the negative electrode 12 such as copper or a film for which the metal is arranged on a surface layer or the like can be used. An ideal example of the negative electrode core 40 is metal foil a main component of which is copper, and may be copper foil configured practically by copper only. The thickness of the negative electrode core 40 is thinner than the thickness of the positive electrode core 30 and is 4 μm to 15 μm, for example. At the negative electrode 12, for example, the negative electrode active material layer 41 is not formed at both longitudinal direction end portions, an exposed portion 43 where the surface of the negative electrode core 40 is exposed is formed, and the negative electrode lead 21 (not illustrated in FIG. 2) is connected to the exposed portion 43.

The negative electrode core 40 may be either of rolled copper foil manufactured by hot rolling an ingot of high purity and electrolytic copper foil manufactured by electroplating. The electrolytic copper foil is manufactured while controlling a crystal grain diameter by adjusting a type, a concentration and a deposition speed or the like of an additive. Generally, the copper foil is easily elongated when the crystal grain diameter of the copper foil is large, and the copper foil is not easily elongated when the crystal grain diameter is small. The crystal grains of the copper foil can be confirmed by a scanning electron microscope (SEM).

The negative electrode core 40 is, as described above, a belt-like long body, and the tensile elongation percentage at the width direction center portion is higher than the tensile elongation percentage at both width direction end portions. The tensile elongation percentage at the width direction center portion of the negative electrode core 40 is preferably 1.2 times of the tensile elongation percentage at both width direction end portions or higher, is more preferably two times or higher, and is further more preferably three times or higher. In the present embodiment, a first region 44 is formed so that the tensile elongation percentage at the width direction center portion of the negative electrode core 40 becomes high. At the negative electrode core 40, the first region 44 which is a high elongation region and a second region 45 where the tensile elongation percentage is lower than that in the first region 44 are present. The second region 45 is arranged in a range including both width direction end portions of the negative electrode core 40 such that the tensile elongation percentage at the width direction center portion of the negative electrode core 40 becomes higher than the tensile elongation percentage at both width direction end portions.

The first region 44 is preferably formed along the longitudinal direction of the negative electrode core 40. In the example illustrated in FIG. 2, the first region 44 is formed in a fixed width over the entire length of the negative electrode core 40. The first region 44 is formed in a belt shape centering on the width direction center of the negative electrode core 40, for example. The width of the first region 44 is preferably 25% or less of the entire width of the negative electrode core 40, is more preferably 20% or less, and is especially preferably 15% or less. A lower limit value of the width of the first region 44 is preferably 5%, is more preferably 8%, and is especially preferably 10%.

At the width direction center portion of the negative electrode core 40, the negative electrode active material layer 41 is expanded and pulled to both sides in the width direction during charging, for example. In particular, for an region Z opposite to an edge of the positive electrode active material layer 31, since volume is changed by charging/discharging at the part opposite to the positive electrode active material layer 31 of the negative electrode active material layer 41 but the volume is not changed at the part not opposite to the positive electrode active material layer 31, larger stress easily acts in the region Z compared to the other region. By forming the first region 44 which is the high elongation region at the width direction center portion of the negative electrode core 40, local deformation of the negative electrode 12 can be efficiently suppressed. Note that, when the tensile elongation percentage of the entire negative electrode core 40 is increased, as described above, failures such as decline of a capacity and decline of production stability are concerned.

The tensile elongation percentage of the negative electrode core 40 is measured by a following method based on IPC-TM-650.

(1) A sample piece is manufactured by cutting a measurement target part of the negative electrode core 40 into 100 mm×12.7 mm with a sharp cutting blade.

(2) One end of the sample piece is attached to a lower side chuck of a universal tester (manufactured by Shimadzu Corporation, Autograph AG-IS10KN), and the other end of the sample piece is attached to an upper side chuck (an inter-chuck distance: 50 mm).

(3) At room temperature (about 25° C.), the sample piece is pulled by moving a crosshead to which the upper side chuck is fixed at a fixed speed, and a length of the sample piece after the sample piece is fractured is measured. An elongation percentage is calculated from a change of the length of the sample piece between the chucks before and after a tension test.

The tensile elongation percentage measured by the method described above in the first region 44 is preferably 9% or higher and is more preferably 13% or higher. An upper limit value of the tensile elongation percentage in the first region 44 is preferably 30%, and is more preferably 20%. The tensile elongation percentage measured by the method described above in the second region 45 is lower than 9% for example, and is preferably 5% or lower. The lower limit value of the tensile elongation percentage in the second region 45 is 1% for example. When the tensile elongation percentages in the first region 44 and the second region 45 are within the range, the local deformation of the negative electrode 12 can be suppressed without causing the failures such as the capacity decline.

For the negative electrode core 40, the number of the crystal grains per unit area at the width direction center portion is smaller than the number of crystal grains per unit area at both width direction end portions. The number of the crystal grains per unit area at the width direction center portion of the negative electrode core 40 is preferably ½ or less of the number of the crystal grains per unit area at both width direction end portions, is more preferably ⅕ or less, and is especially preferably 1/10 or less.

The crystal grains of the negative electrode core 40 can be confirmed by a SEM as described above. The number of the crystal grains per unit area is obtained by measuring the crystal grains present in a range of a predetermined square in a sectional SEM image of the negative electrode core 40. The number of the crystal grains at the width direction center portion of the negative electrode core 40 can be measured by matching the center of the predetermined square with the width direction center of the negative electrode core 40, for example. The number of the crystal grains at both width direction end portions of the negative electrode core 40 can be measured by matching one side of the predetermined square with one end or the other end in the width direction of the negative electrode core 40, for example. At the time, a size of the square is preferably determined so as to include at least one crystal grain at the width direction center portion of the negative electrode core 40.

In the present embodiment, the number per unit area of the crystal grains in the first region 44 which is the high elongation region is smaller than the number per unit area of the crystal grains in the second region 45 which is a low elongation region. Since the first region 44 is present in the range including the width direction center portion of the negative electrode core 40 and the second region 45 is present in the range including both width direction end portions of the negative electrode core 40, the tensile elongation percentage at the width direction center portion is higher than the tensile elongation percentage at both width direction end portions for the negative electrode core 40.

The first region 44 is formed by locally heat-treating a part including the width direction center portion of the negative electrode core 40. A heat treatment method of the negative electrode core 40 is not limited in particular, however, it is preferable to apply contact type heating means. For example, a part of the negative electrode core 40 can be locally heat-treated by using a heat roller or a hot plate which holds the negative electrode core 40 from both sides in a thickness direction. A heat treatment temperature is different depending on the metal configuring the negative electrode core 40, and in the case of the copper foil, it is preferably 160° C. to 250° C. and is more preferably 180° C. to 220° C. Note that it is also possible to perform heat treatment of the negative electrode core 40 by heating the negative electrode core 40 together with the negative electrode active material layer 41 after the negative electrode active material layer 41 is formed.

It is preferable that the negative electrode active material layer 41 includes a negative active material and a binder and is formed on both surfaces of the negative electrode core 40. The negative electrode active material layer 41 has the thickness of 60 μm to 100 μm on one side of the negative electrode core 40 for example, and is formed on both surfaces of the negative electrode core 40 respectively with the same thickness. The negative electrode 12 can be manufactured by applying negative electrode mixture slurry including the negative electrode active material and the binder or the like onto the negative electrode core 40 the width direction center portion of which is locally heat-treated, drying and then compressing a coated film and forming the negative electrode active material layer 41 on both surfaces of the negative electrode core 40.

The negative electrode active material includes a carbon-based active material which reversibly occludes and releases lithium ions, for example. The ideal carbon-based active material is graphite, such as natural graphite such as flaky graphite, massive graphite and earthy graphite and artificial graphite such as massive artificial graphite (MAG) and graphitized mesophase carbon microbeads (MCMB). In addition, for the negative electrode active material, a Si-based active material configured by at least one of Si and an Si-containing compound may be used or the carbon-based active material and the Si-based active material may be used together. A lithium metal may be also used for the negative electrode active material, and in that case, the negative electrode active material layer 41 can be formed without using the binder.

For the binder included in the negative electrode active material layer 41, similarly to the case of the positive electrode 11, fluorocarbon resin, PAN, polyimide resin, acrylic resin and polyolefin resin or the like can be used, however, it is preferable to use styrene-butadiene rubber (SBR). In addition, the negative electrode active material layer 41 preferably includes CMC or the salt thereof, polyacrylic acid (PAA) or the salt thereof, and polyvinyl alcohol (PVA) or the like, further. Among them, it is ideal to use SBR, CMC or the salt thereof and PAA or the salt thereof together.

[Separator]

For the separator 13, a porous sheet having ion permeability and an insulation property is used. Specific examples of the porous sheet are a microporous thin film, woven fabric and non-woven fabric. Ideal materials of the separator 13 are polyolefin such as polyethylene, polypropylene and a copolymer of ethylene and α olefin, and cellulose or the like. The separator 13 may be either of a single layer structure and a laminated structure. On the surface of the separator 13, a heat resistant layer including inorganic particles or a heat resistant layer configured by highly heat resistant resin such as aramid resin, polyimide and polyamide-imide or the like may be formed.

EXAMPLES

The present disclosure will be explained further by examples hereinafter, however, the present disclosure is not limited by the examples.

Example 1

[Heat Treatment of Copper Foil]

Both width direction ends of the copper foil of 8 μm thickness cut into 40 mm in width×100 mm in length were lifted to slacken the copper foil. The width direction center portion of the slackened copper foil was pressed to a hot plate heated to 190° C. using a heat resistant jig of 5 mm width from above. At the time, force of lifting the copper foil was adjusted so that the part where the copper foil was in contact with the hot plate was only the part pressed by the heat resistant jig and a fold was not made at the part where an edge of the heat resistant jig was in contact. The state was continued for five minutes and the heat treatment of the copper foil was ended. Thus, the copper foil relating to Example 1 for which the high elongation region having the high elongation percentage is formed at the width direction center portion over the entire length in the longitudinal direction was obtained. Note that the heat treatment was performed in a dry box where a dew point was −30° C. or lower.

Comparative Example 1

The copper foil before the heat treatment of Example 1 was defined as the copper foil relating to Comparative Example 1.

Comparative Example 2

Except that the heat treatment was performed by pressing the entire copper foil to the hot plate heated to 190° C., the copper foil relating to Comparative Example 2 was obtained similarly to Example 1.

[Pressurization Test of Copper Foil]

In order to simulate a state where the copper foil as the negative electrode core was locally loaded by expansion/contraction of the negative electrode active material layer accompanying charging/discharging of the battery, a pressurization test was performed by a following method using a universal tester (the autograph described above). The pressurization test was performed for the individual copper foil of Example 1, Comparative Example 1 and Comparative Example 2.

A jig of 20 mm square manufactured by SUS Corporation was fixed to an upper part and a base manufactured by SUS Corporation was fixed to a lower part respectively horizontally to ground. The heat-treated copper foil was placed on the base and a fluororubber sheet of 1 mm thickness cut into 25 mm square was put on the copper foil. At the time, the copper foil and the rubber sheet were arranged so as to match the centers of the jig, the rubber sheet and the copper foil. In the state, the jig at the upper part was lowered until the load of 8 kN was applied to the jig at a speed of 0.5 mm/sec by the universal tester. Thereafter, the jig was elevated until no more load was applied to the jig at the same speed, and presence/absence of fracture of the copper foil was confirmed. A tape (9 mm in width and 30 μm in thickness) made of polypropylene was stuck to one surface of the copper foil and the present test was performed in the state of turning the tape to the base side. A level difference of the tape was provided in order to simulate the region Z illustrated in FIG. 2 where the local load is applied to the electrode assembly. The tape was stuck so as to position one width direction end at the width direction center of the copper foil.

[Measurement of Tensile Elongation Percentage of Copper Foil]

By the method described above, the tensile elongation percentages of the individual copper foil of Comparative Example 1 and Comparative Example 2 were measured. Note that the width direction center portion of the copper foil of Example 1 and the copper foil of Comparative Example 2 were heat-treated under a same condition. In addition, both width direction end portions of the copper foil of Example 1 were not heat-treated similarly to the copper foil of Comparative Example 1. Accordingly, for the individual tensile elongation percentages at the width direction center portion and both width direction end portions in Table 1, measured results of Comparative Example 2 and Comparative Example 1 were used respectively.

[Observation of Crystal Grains of Copper Foil]

From the sectional SEM image of the copper foil, the numbers of the crystal grains present in the range of the predetermined square of the individual copper foil of Example 1, Comparative Example 1 and Comparative Example 2 were measured.

TABLE 1

| Evaluation | | Example 1 | Comparative Example 1 | Comparative Example 2 |
|---|---|---|---|---|
| Foil fracture | | Absent | Present | Absent |
| Tensile elongation percentage | Width direction center portion | 14% | 4% | 14% |
| | Both width direction end portions | 4% | | |
| Number of Crystal grains | Width direction center portion | 2 | 33 | 2 |
| | Both width direction end portions | 33 | | |

As illustrated in Table 1, the copper foil of Example 1 for which the high elongation region is formed at the width direction center portion has fracture resistance similarly to the case where the entire copper foil is heat-treated (Comparative Example 2). That is, since the high elongation region absorbs the local load, the local deformation accompanying the charging/discharging is suppressed for the negative electrode including the copper foil of Example 1. In the copper foil of Comparative Example 1 without the presence of the high elongation region, the fracture occurs in the pressurization test. Further, for the copper foil of Example 1, since the tensile elongation percentage at both width direction end portions is low, the elongation of the copper foil due to tension during manufacture and the charging/discharging is suppressed compared to Comparative Example 2 in which the tensile elongation percentage of the entire copper foil is high. Thus, the failures such as the decline of the production stability and the decline of a battery capacity due to regulation of the size of the electrode plate can be avoided.

REFERENCE SIGNS LIST

10 secondary battery, 11 positive electrode, 12 negative electrode, 13 separator, 14 electrode assembly, 16 outer housing can, 17 sealing assembly, 18 and 19 insulating plates, 20 positive electrode lead, 21 negative electrode lead, 22 grooved portion, 23 internal terminal plate, 24 lower vent member, 25 insulating member, 26 upper vent member, 27 cap, 28 gasket, 30 positive electrode core, 31 positive electrode active material layer, 40 negative electrode core, 41 negative electrode active material layer, 43 exposed portion, 44 first region, 45 second region

The invention claimed is:

1. A secondary battery, comprising an electrode assembly including a belt-like positive electrode, a belt-like negative electrode, and a belt-like separator, wherein the positive electrode and the negative electrode are laminated via the separator in a thickness direction, the positive electrode includes a positive electrode core elongated in a longitudinal direction orthogonal to the thickness direction and to a width direction, and a positive electrode active material layer formed on a surface of the positive electrode core, the negative electrode includes a negative electrode core elongated in a longitudinal direction orthogonal to the thickness direction and to a width direction, and a negative electrode active material layer formed on a surface of the negative electrode core, and the negative electrode core exhibits varying tensile elongation percentages depending on locations in the width direction, measured on specimens each encompassing an entire dimension of the negative electrode core in the thickness direction, such that a first tensile elongation percentage at a center portion of the negative electrode core in the width direction is higher than a second tensile elongation percentage at both end portions of the negative electrode core in the width direction.

2. The secondary battery according to claim 1, wherein the first tensile elongation percentage is equal to or higher than 1.2 times of the second tensile elongation percentage.

3. A secondary battery, comprising an electrode assembly including a belt-like positive electrode, a belt-like negative electrode, and a belt-like separator, wherein the positive electrode and the negative electrode are laminated via the separator in a thickness direction, the positive electrode includes a positive electrode core elongated in a longitudinal direction orthogonal to the thickness direction and to a width direction, and a positive electrode active material layer formed on a surface of the positive electrode core, the negative electrode includes a negative electrode core elongated in a longitudinal direction orthogonal to the thickness direction and to a width direction, and a negative electrode active material layer formed on a surface of the negative electrode core, and the negative electrode core exhibits varying numbers of crystal grains per unit area depending on locations in the width direction, measured on specimens located at a uniform height in the thickness direction, such that a first number of crystal grains per unit area at a center portion of the negative electrode core in the width direction is smaller than a second number of crystal grains per unit area at both end portions of the negative electrode core in the width direction.

4. The secondary battery according to claim 3, wherein the first number of the crystal grains per unit area is equal to or smaller than ½ of the second number of the crystal grains per unit area.

5. The secondary battery according to claim 1, wherein each of the center portion and both end portions extends across an entire length in the longitudinal direction of the negative electrode core, and the center portion encompasses 25% or less of an entire width in the width direction of the negative electrode core.

6. The secondary battery according to claim 3, wherein each of the center portion and both end portions extends across an entire length in the longitudinal direction of the negative electrode core, and the center portion encompasses 25% or less of an entire width in the width direction of the negative electrode core.

* * * * *